(12) United States Patent
Lee et al.

(10) Patent No.: US 10,849,005 B2
(45) Date of Patent: Nov. 24, 2020

(54) METHOD FOR PERFORMING RADIO LINK MONITORING AND FAILURE PROCEDURE OF MULTI BEAMS OPERATION IN WIRELESS COMMUNICATION SYSTEM AND A DEVICE THEREFOR

(71) Applicant: LG Electronics Inc., Seoul (KR)

(72) Inventors: Jaewook Lee, Seoul (KR); Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/503,264

(22) Filed: Jul. 3, 2019

(65) Prior Publication Data

US 2019/0327634 A1     Oct. 24, 2019

Related U.S. Application Data

(63) Continuation of application No. PCT/KR2018/000232, filed on Jan. 5, 2018.

(Continued)

(51) Int. Cl.
*H04W 4/00* (2018.01)
*H04W 24/10* (2009.01)
(Continued)

(52) U.S. Cl.
CPC ........... *H04W 24/10* (2013.01); *H04W 24/08* (2013.01); *H04W 56/0005* (2013.01);
(Continued)

(58) Field of Classification Search
CPC .................................................. H04W 24/10
See application file for complete search history.

(56) References Cited

U.S. PATENT DOCUMENTS

2006/0183429 A1* 8/2006 Anderson ................. H04L 1/20
                                                            455/67.13
2007/0191048 A1* 8/2007 Catreux-Erceg .... H04W 52/241
                                                            455/522

(Continued)

FOREIGN PATENT DOCUMENTS

JP       2018504822       2/2018
KR     1020150124386     11/2015

(Continued)

OTHER PUBLICATIONS

MediaTek Inc., "RLM and RLF in HF NR," R2-168130, 3GPP TSG-RAN WG2 Meeting #96, Reno, USA, Nov. 14-18, 2016, 5 pages.

(Continued)

*Primary Examiner* — Guang W Li
(74) *Attorney, Agent, or Firm* — Fish & Richardson P.C.

(57) ABSTRACT

The present invention relates to a wireless communication system. More specifically, the present invention relates to a method and a device for performing radio link monitoring and failure procedure of multi beams operation in wireless communication system, the method comprising: measuring each of downlink radio link quality of multiple serving beams of a cell; sending a first indication to an upper layer of the UE when all the serving beams meet an out-of-sync condition; and sending a second indication to the upper layer of the UE when at least one serving beam meet an in-sync condition.

18 Claims, 11 Drawing Sheets

Related U.S. Application Data

(60) Provisional application No. 62/443,575, filed on Jan. 6, 2017.

(51) Int. Cl.

| | | |
|---|---|---|
| *H04W 76/18* | (2018.01) | |
| *H04W 76/27* | (2018.01) | |
| *H04W 24/08* | (2009.01) | |
| *H04W 56/00* | (2009.01) | |
| *H04W 72/04* | (2009.01) | |
| *H04W 80/08* | (2009.01) | |

(52) U.S. Cl.
CPC ......... *H04W 72/046* (2013.01); *H04W 76/18* (2018.02); *H04W 76/27* (2018.02); *H04W 80/08* (2013.01)

(56) References Cited

U.S. PATENT DOCUMENTS

| | | | | |
|---|---|---|---|---|
| 2010/0265847 | A1* | 10/2010 | Lee | H04W 48/02 370/254 |
| 2010/0330921 | A1* | 12/2010 | Kim | H04W 24/10 455/67.11 |
| 2011/0021154 | A1* | 1/2011 | Marinier | H04W 72/02 455/67.11 |
| 2012/0002554 | A1* | 1/2012 | Ishii | H04B 17/29 370/242 |
| 2012/0147755 | A1* | 6/2012 | Chen | H04L 5/001 370/242 |
| 2012/0224470 | A1* | 9/2012 | Jeong | H04W 36/08 370/221 |
| 2012/0281548 | A1* | 11/2012 | Lin | H04W 76/18 370/242 |
| 2014/0036659 | A1* | 2/2014 | Gao | H04W 24/04 370/216 |
| 2014/0098754 | A1* | 4/2014 | Luo | H04L 5/0053 370/329 |
| 2014/0286176 | A1* | 9/2014 | Ro | H04W 24/04 370/242 |
| 2015/0201354 | A1* | 7/2015 | Zhang | H04W 36/0022 370/221 |
| 2015/0296487 | A1* | 10/2015 | Takeda | H04W 24/08 370/329 |
| 2016/0337227 | A1* | 11/2016 | Palenius | H04L 1/20 |
| 2017/0150444 | A1* | 5/2017 | Li | H04W 24/08 |
| 2017/0171784 | A1* | 6/2017 | Mitsui | H04W 76/18 |
| 2017/0223561 | A1* | 8/2017 | Radulescu | H04W 76/38 |
| 2019/0037604 | A1* | 1/2019 | Akkarakaran | H04L 5/001 |
| 2019/0081689 | A1* | 3/2019 | Yu | H04W 24/04 |
| 2019/0081753 | A1* | 3/2019 | Jung | H04B 7/0617 |
| 2019/0089447 | A1* | 3/2019 | Sang | H04W 36/00837 |
| 2020/0037332 | A1* | 1/2020 | da Silva | H04L 5/0023 |
| 2020/0067589 | A1* | 2/2020 | Jeong | H04W 24/10 |

FOREIGN PATENT DOCUMENTS

| | | | |
|---|---|---|---|
| WO | WO2016095688 | 6/2016 | |
| WO | WO2016168985 | 10/2016 | |
| WO | WO-2018064483 A1 * | 4/2018 | ............... H04L 1/00 |

OTHER PUBLICATIONS

Intel Corporation, "Radio link monitoring and radio link failure handling," R2-168517, 3GPP TSG RAN WG2 Meeting #96, Reno, USA, Nov. 14-18, 2016, 3 pages.

Ericsson, "RLM and RLF in NR," R2-168722, 3GPP TSG-RAN WG2 Meeting #96, Reno, Nevada, USA, Nov. 14-18, 2016, 3 pages.

Samsung, "Radio Link Failure operation in High Frequency NR systems," R2-168822, 3GPP TSG RAN WG2 #96, Reno, USA, Nov. 14-18, 2016, 4 pages.

PCT International Search Report and Written Opinion in International Application No. PCT/KR2018/000232, dated Apr. 12, 2018, 11 pages.

Extended European Search Report in European Application No. 18736450.0, dated Jul. 16, 2020, 12 pages.

Intel Corporation, "Considerations on radio link failure," R2-166878, 3GPP TSG RAN WG2 Meeting #95bis, Kaohsiung, dated Oct. 10-14, 2016, 3 pages, XP051151318.

Samsung, "Radio Link Failure detection in mmW systems," R2-163800, 3GPP TSG-RAN WG2 Meeting #94, Nanjing, China, dated May 23-27, 2016, 3 pages.

3rd Generation Partnership Project; Technical Specification Group Radio Access Network; Evolved Universal Terrestrial Radio Access (E-UTRA); "Radio Resource Control (RRC); Protocol specification (Release 14)," 3GPP TS 36.331 V14.0.0, dated Sep. 2016, 644 pages.

3rd Generation Partnership Project; Technical Specification Group Radio Access Network; Evolved Universal Terrestrial Radio Access (E-UTRA); "Requirements for support of radio resource management (Release 14)," 3GPP TS 36.133 V14.1.0, dated Sep. 2016, 2226 pages.

3rd Generation Partnership Project; Technical Specification Group Radio Access Network; Evolved Universal Terrestrial Radio Access (E-UTRA); "Physical layer procedures (Release 14)," 3GPP TS 36.213 V14.0.0, dated Sep. 2016, 406 pages.

Japanese Office Action in Japanese Application No. 2019-536963, dated Sep. 29, 2020, 6 pages (with English translation).

LG Electronics Inc., "RLM and RLF," R2-1700513, 3GPP TSG-RAN2 NR AH, dated Jan. 17-19, 2017, 2 pages.

* cited by examiner (a) Control-Plane Protocol Stack (b) User-Plane Protocol Stack (a) Control-Plane Protocol Stack (b) User-Plane Protocol Stack

METHOD FOR PERFORMING RADIO LINK MONITORING AND FAILURE PROCEDURE OF MULTI BEAMS OPERATION IN WIRELESS COMMUNICATION SYSTEM AND A DEVICE THEREFOR

CROSS-REFERENCE TO RELATED APPLICATIONS

This application is a continuation of International Application No. PCT/KR2018/000232, filed on Jan. 5, 2018, which claims the benefit of U.S. Provisional Application No. 62/443,575, filed on Jan. 6, 2017. The disclosures of the prior applications are incorporated by reference in their entirety.

TECHNICAL FIELD

The present invention relates to a wireless communication system and, more particularly, to a method for performing radio link monitoring and failure procedure of multi beams operation in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing radio link monitoring and failure procedure of multi beams operation in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, it is proposed of methods of how out-of-sync/in-sync is informed from physical layer to upper layer.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
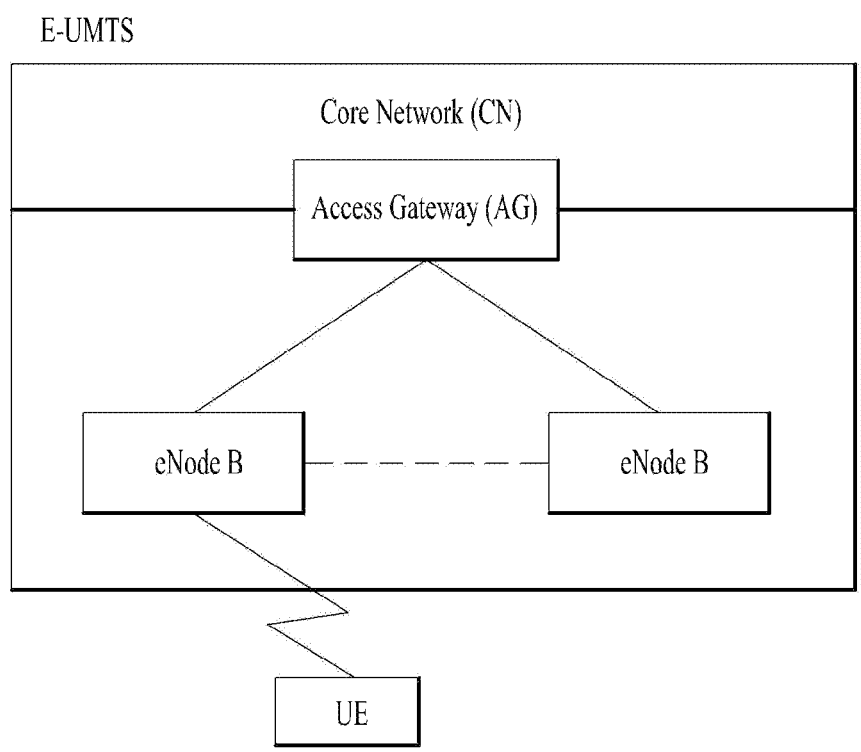
FIG. 1 is a diagram showing a network structure of an Evolved Universal Mobile Telecommunications System (E-UMTS) as an example of a wireless communication system.
Figure 2A:
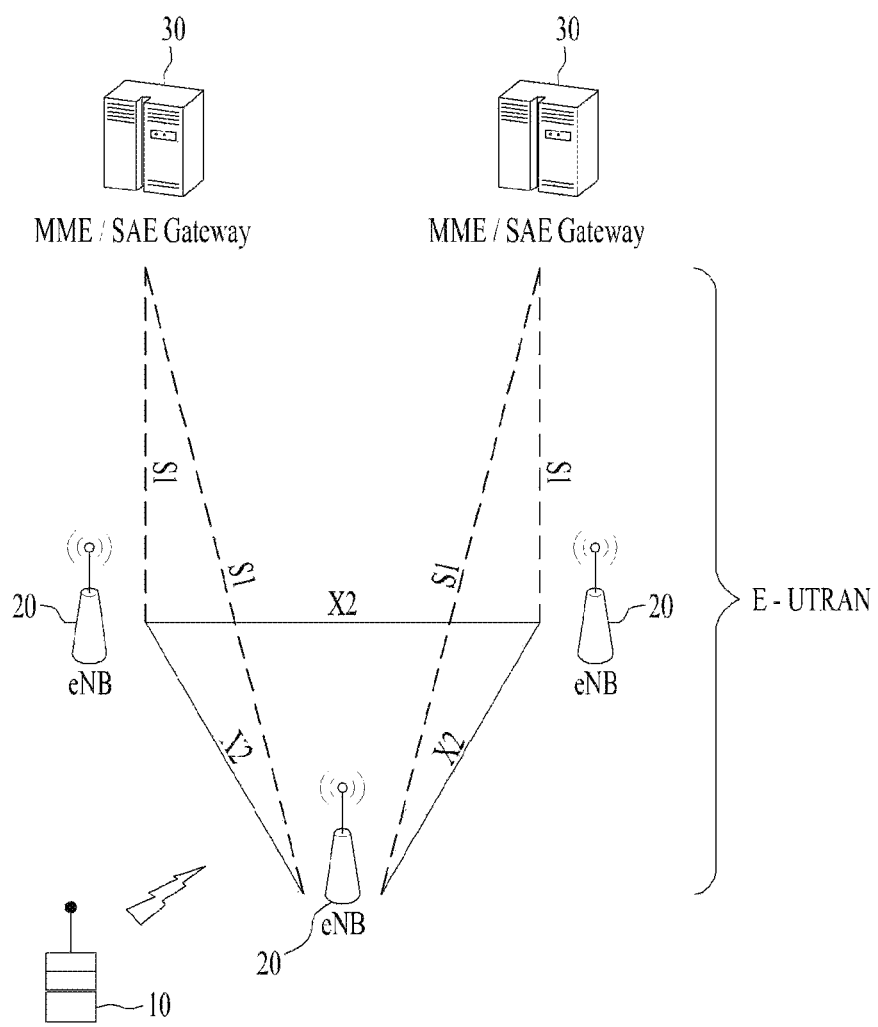
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
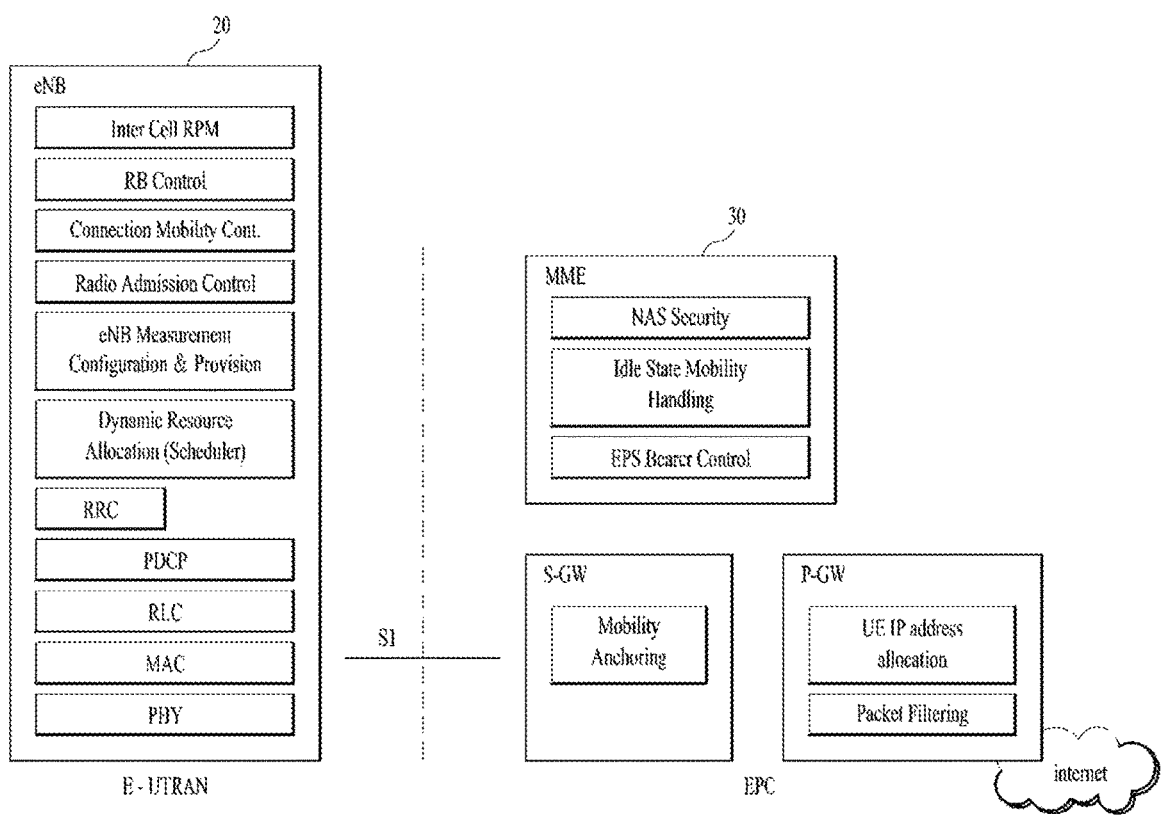
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
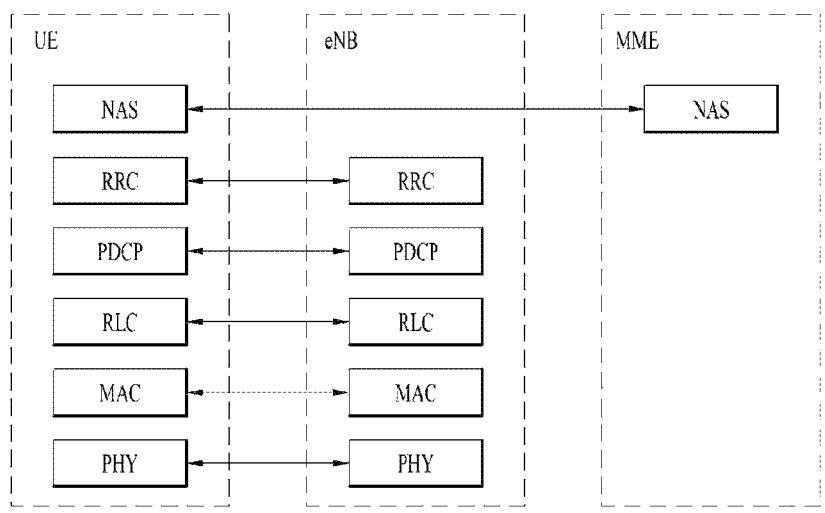
FIG. 3 is a diagram showing a control plane and a user plane of a radio interface protocol between a UE and an E-UTRAN based on a 3rd generation partnership project (3GPP) radio access network standard.
Figure 3:
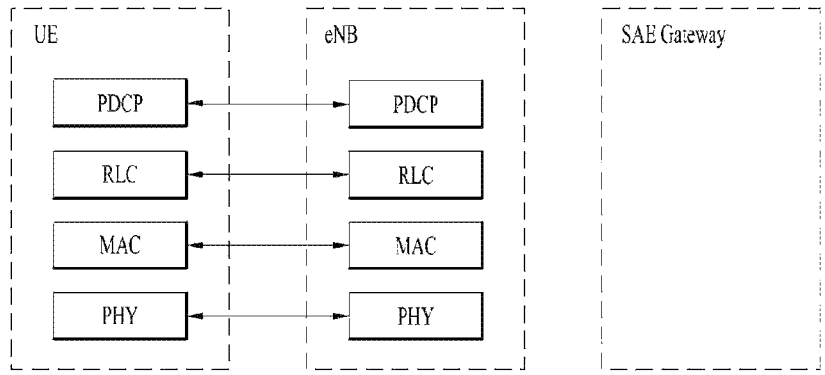

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
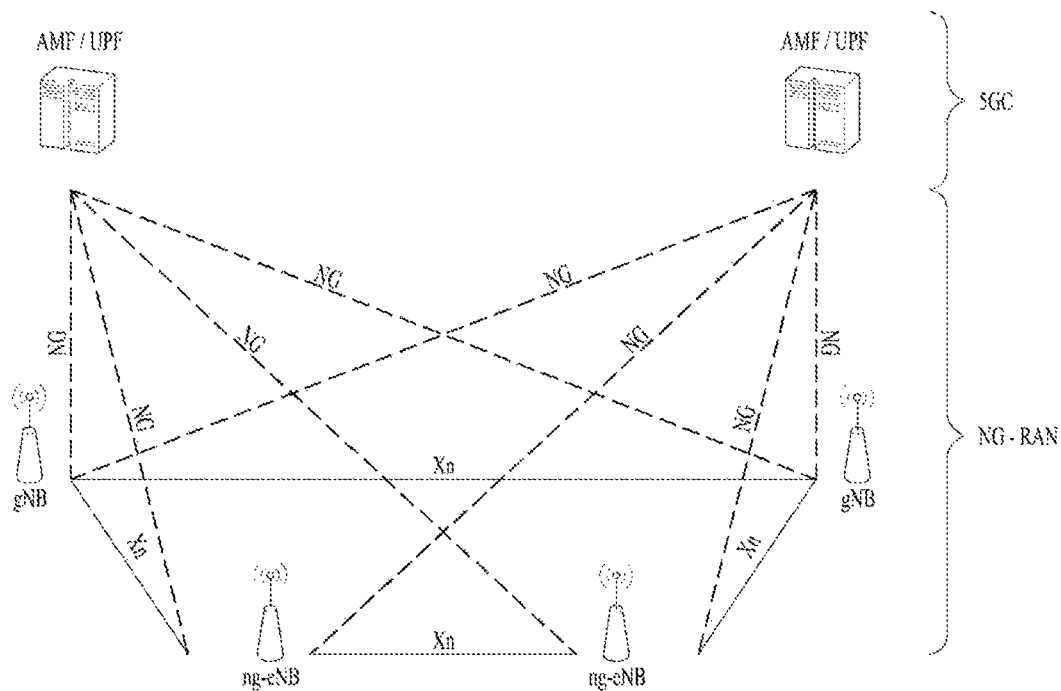
FIG. 4A is a block diagram illustrating network structure of NG Radio Access Network (NG-RAN) architecture.
Figure 4B:
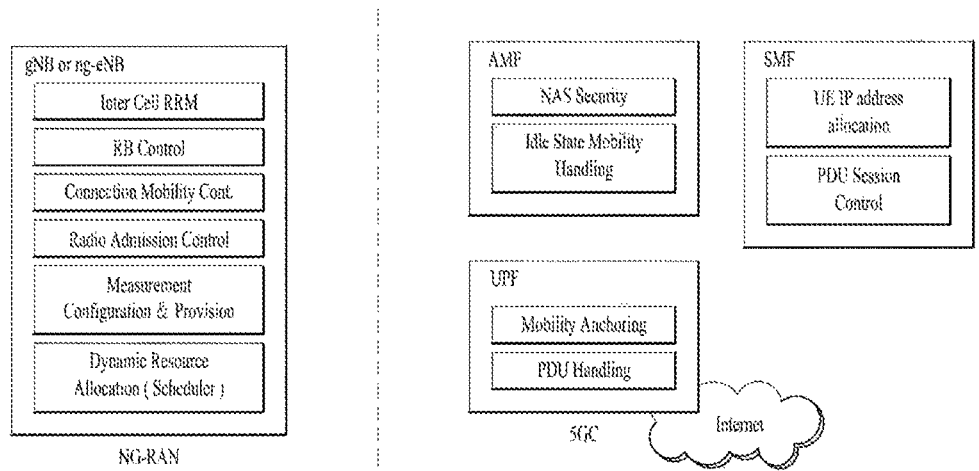
FIG. 4B is a block diagram depicting architecture of functional Split between NG-RAN and 5G Core Network (5GC)

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
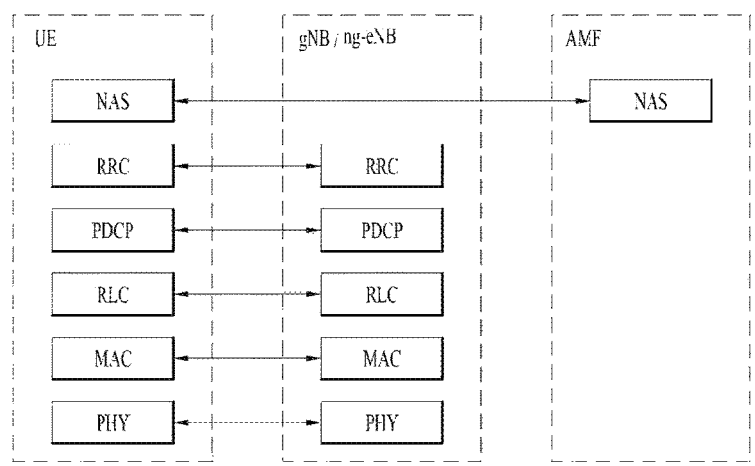
FIG. 5 is a diagram showing a control plane and a user plane of a radio interface protocol between a UE and a NG-RAN based on a 3rd generation partnership project (3GPP) radio access network standard.
Figure 5:
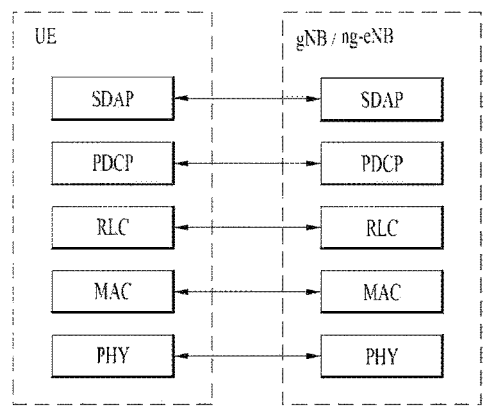

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
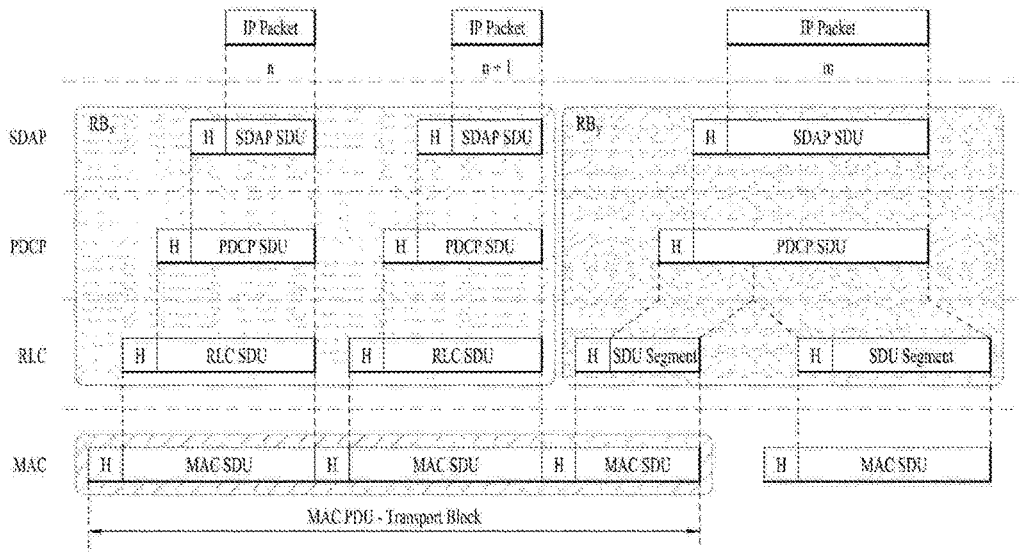
FIG. 6 is an example for L2 data flow between a UE and a NG-RAN.

FIG. 6 is an example for L2 data flow between a UE and a NG-RAN.

An example of the Layer 2 Data Flow is depicted on FIG. 6, where a transport block is generated by MAC by concatenating two RLC PDUs from RBx and one RLC PDU from RBy. The two RLC PDUs from RBx each corresponds to one IP packet (n and n+1) while the RLC PDU from RBy is a segment of an IP packet (m).

Figure 7:
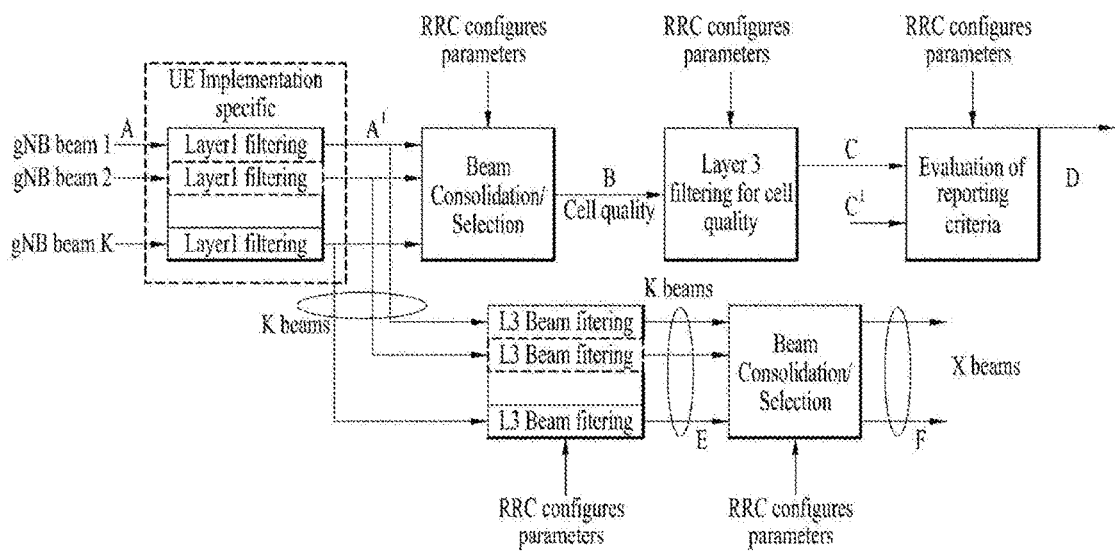
FIG. 7 is an example for high-level measurement model in NR.

FIG. 7 is an example for high-level measurement model in NR.

In RRC_CONNECTED, the UE measures multiple beams (at least one) of a cell and the measurements results (power values) are averaged to derive the cell quality. In doing so, the UE is configured to consider a subset of the detected beams: the N best beams above an absolute threshold. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

The corresponding high-level measurement model is described in FIG. 7.

It is a note that K beams correspond to the measurements on NR-SS block or CSI-RS resources configured for L3 mobility by gNB and detected by UE at L1.

'A' is measurements (beam specific samples) internal to the physical layer.

'Layer 1 filtering' is an internal layer 1 filtering of the inputs measured at point A. Exact filtering is implementation dependent. How the measurements are actually executed in the physical layer by an implementation (inputs A and Layer 1 filtering) in not constrained by the standard.

'A1' is measurements (i.e. beam specific measurements) reported by layer 1 to layer 3 after layer 1 filtering.

'Beam Consolidation/Selection' is that beam specific measurements are consolidated to derive cell quality if N>1, else when N=1 the best beam measurement is selected to derive cell quality. The behaviour of the Beam consolidation/selection is standardised and the configuration of this module is provided by RRC signalling. Reporting period at B equals one measurement period at A1.

'B' is a measurement (i.e. cell quality) derived from beam-specific measurements reported to layer 3 after beam consolidation/selection.

'Layer 3 filtering for cell quality' is a filtering performed on the measurements provided at point B. The behaviour of the Layer 3 filters is standardised and the configuration of the layer 3 filters is provided by RRC signalling. Filtering reporting period at C equals one measurement period at B.

'C' is a measurement after processing in the layer 3 filter. The reporting rate is identical to the reporting rate at point B. This measurement is used as input for one or more evaluation of reporting criteria.

'Evaluation of reporting criteria' is that checks whether actual measurement reporting is necessary at point D. The evaluation can be based on more than one flow of measurements at reference point C e.g. to compare between different measurements. This is illustrated by input C and C1. The UE shall evaluate the reporting criteria at least every time a new measurement result is reported at point C, C1. The reporting criteria are standardised and the configuration is provided by RRC signalling (UE measurements).

'D' is measurement report information (message) sent on the radio interface.

'L3 Beam filtering' is an filtering performed on the measurements (i.e. beam specific measurements) provided at point A1. The behaviour of the beam filters is standardised and the configuration of the beam filters is provided by RRC signalling. Filtering reporting period at E equals one measurement period at A1.

'E' is a measurement (i.e. beam-specific measurement) after processing in the beam filter. The reporting rate is identical to the reporting rate at point A1. This measurement is used as input for selecting the X measurements to be reported.

'Beam Selection for beam reporting' that selects the X measurements from the measurements provided at point E. The behaviour of the beam selection is standardised and the configuration of this module is provided by RRC signaling.

'F' is beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in 3GPP TS 38.133.

Layer 3 filtering for cell quality and related parameters used are specified in 3GPP TS 38.331 and does not introduce any delay in the sample availability between B and C. Measurement at point C, C1 is the input used in the event evaluation. L3 Beam filtering and related parameters used are specified in 3GPP TS 38.331 and do not introduce any delay in the sample availability between E and F.

Measurement reports are characterized by the following: i) measurement reports include the measurement identity of the associated measurement configuration that triggered the reporting; ii) cell and beam measurement quantities to be included in measurement reports are configured by the network, iii) the number of non-serving cells to be reported can be limited through configuration by the network; iv) cells belonging to a blacklist configured by the network are not used in event evaluation and reporting, and conversely when a whitelist is configured by the network, only the cells belonging to the whitelist are used in event evaluation and reporting; and v) beam measurements to be included in measurement reports are configured by the network (beam identifier only, measurement result and beam identifier, or no beam reporting.

Figure 8:
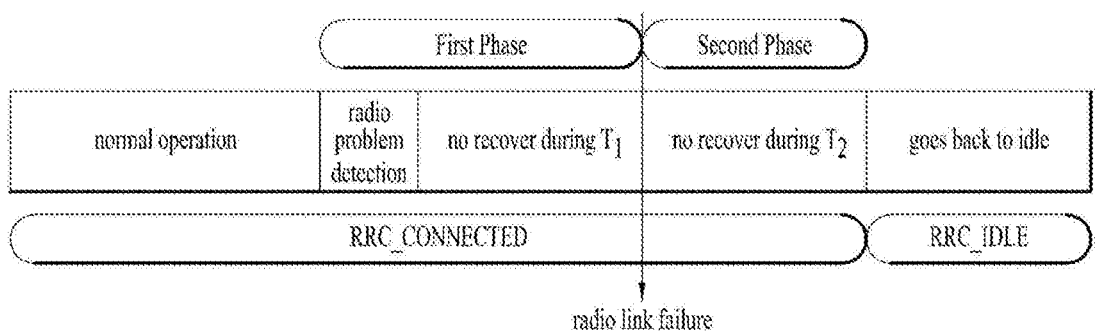
FIG. 8 is an example for radio link failure operation in LTE.

FIG. 8 is an example for radio link failure operation in LTE.

Two phases govern the behavior associated to radio link failure as shown on FIG. 8

The first phase includes that: i) started upon radio problem detection; ii) leads to radio link failure detection; iii) no UE-based mobility; iv) based on timer or other (e.g. counting) criteria (T1).

The second phase includes that: i) started upon radio link failure detection or handover failure; ii) leads to RRC_IDLE; iii) UE-based mobility; and iv) timer based (T2).

In RRC_CONNECTED, the UE declares Radio Link Failure (RLF) when one of the following criteria are met: i) expiry of a timer started after indication of radio problems from the physical layer (if radio problems are recovered before the timer is expired, the UE stops the timer); ii) Random access procedure failure; or iii) RLC failure.

After RLF is declared, the UE stays in RRC_CONNECTED, ii) selects a suitable cell and then initiates RRC re-establishment, and iii) enters RRC_IDLE if a suitable cell wasn't found within a certain time after RLF was declared.

Especially, regarding expiry of a timer, upon T310 expiry, or upon T312 expiry, or upon random access problem indication from MCG MAC while neither T300, T301, T304 nor T311 is running, the UE considers radio link failure to be detected for the MCG i.e. RLF. Upon receiving N310 consecutive "out-of-sync" indications for the PCell from lower layers while neither T300, T301, T304 nor T311 is running, the UE starts timer T310.

And upon receiving N311 consecutive "in-sync" indications for the PCell from lower layers while T310 is running, the UE stops timer T310, and stops timer T312, if running. In this case, the UE maintains the RRC connection without explicit signaling, i.e. the UE maintains the entire radio resource configuration.

In this case, N310 is a maximum number of consecutive "out-of-sync" indications for the PCell received from lower layers, and N311 is a maximum number of consecutive "in-sync" indications for the PCell received from lower layers.

In designing RLM and RLF for NR, one aspect which should be considered is beam operation, especially in high frequencies. From the UE point of view, beams could be classified into three categories as in serving beams, candidate beams, non-servable beams. Serving beams are the ones which are used to transmit to the UE or receive from the UE. This beam might not be best from the link quality perspectives. Candidate beams are the ones which could replace the serving beam in case of problem in serving beam. The channel qualities of these beams should be better than a certain level. The non-servable beams is considered as ones which have low channel quality so that it could not be used to serve a specific UE. In which case out-of-sync is informed to the upper layer is not determined considering beam operation.

Meanwhile, if there are multiple beams which are visual to the UE and qualities of some of the beams are good enough and those of others are not good, declaring out-of-sync based on just one beam is not preferable from user's QoS point of view. Declaring unnecessary RLF would impact the QoS of the user in terms of service interruption due to recovery from RLF. In order to avoid the problem, informing out-of-sync based on multiple beams (e.g. all serving/candidate beams) is required.

Figure 9:
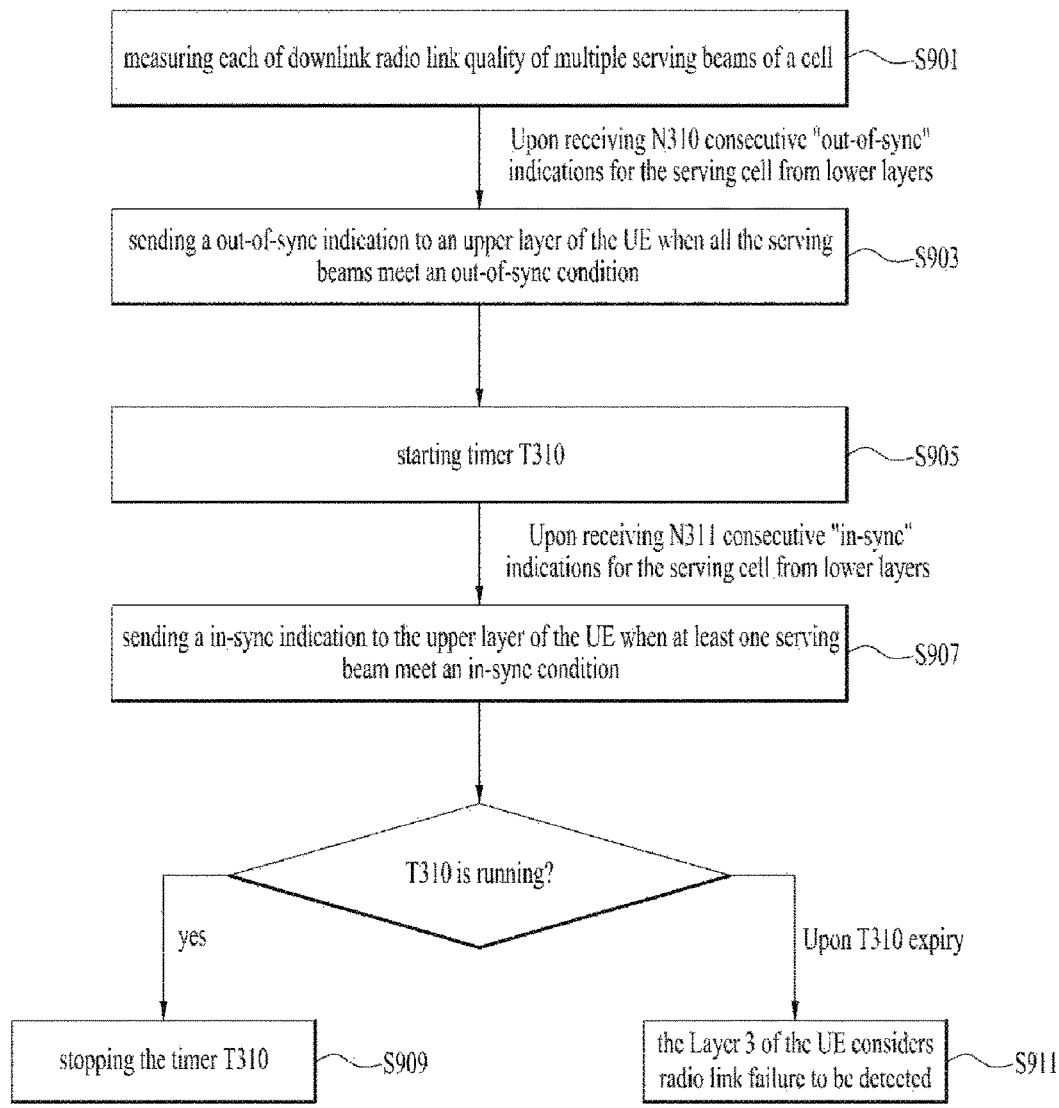
FIGS. 9 and 10 are conceptual diagrams for performing radio link monitoring and failure procedure of multi beams operation in wireless communication system according to embodiments of the present invention.

FIG. 9 is a conceptual diagram for performing radio link monitoring and failure procedure of multi beams operation in wireless communication system according to embodiments of the present invention.

In the invention, it is proposed of methods of how out-of-sync/in-sync is informed from physical layer to upper layer.

Terms in the methods below are defined as follows: i) serving beams are the ones which are currently used to transmit to the UE or receive from the UE. This beam might not be best from the link quality perspectives, ii) candidate beams are the ones which could replace the serving beam in case of problem in serving beam. The channel qualities of these beams should be better than a certain level, and iii) the non-servable beams is considered as ones which have low channel quality so that it could not be used to serve a specific UE.

In the methods below, out-of-sync condition and in-sync condition indicates the following.

An example of out-of-sync condition: when the downlink radio link quality of the serving beam estimated over the last certain time period (e.g. 200 ms) becomes worse than the threshold Qout, Layer 1 of the UE determines that the beam meets out-of-sync condition.

An example of in-sync condition: when the downlink radio link quality of the serving beam estimated over the last certain time period (e.g. 100 ms) becomes better than the threshold Qin, Layer 1 of the UE determines that the beam meets in-sync condition.

In this invention, the Layer 1 of the UE performs radio link monitoring on multiple beams including serving beams so that the UE can make a quick decision to determine the RLF.

In case Layer 1 (i.e. physical layer) of the UE evaluates multiple beams to determine whether to inform out-of-sync to upper layer (i.e. RRC), the time period which Layer 1 of the UE evaluates downlink radio link quality of all evaluated beams is same for all evaluated beams.

In this methods, it is assumed that serving beam can be multiple and also assumed that Layer 1 of the UE knows the serving beams and identity of each serving beam.

The Layer 1 of the UE measures each of downlink radio link quality of multiple serving beams of a serving cell (S901). The Layer 1 of the UE sends an out-of-sync indication for the serving cell to the higher layers within Qout evaluation period, when all the serving beams meet the out-of-sync condition defined above (S903).

In case of N best beams, when all N best beams meet the out-of-sync condition defined above, the Layer 1 of the UE sends an out-of-sync indication for the serving cell to the higher layers within Qout evaluation period.

Additionally, the above embodiment can apply a timer based determination. In this method, the Layer 1 of the UE informs out-of-sync to upper layer (e.g. RRC) when timer in the Layer 1 of the UE expires. The Layer 1 of the UE informs in-sync to upper layer when at least one best beam among serving beams or any beams meets in-sync condition in the Layer 1. When all serving beams (or all N best beams) meet the out-of-sync condition defined above, the Layer 1 of the UE sends an out-of-sync indication for the serving cell to the higher layers within Qout evaluation period and the Layer 1 of the UE starts a timer T1. Until T1 expiry, if there is no beam among N best beams, serving beams or any beams which meets in-sync condition, the Layer 1 of the UE informs an out-of-sync for the serving cell to upper layer upon T1 expiry. The Layer 1 of the UE resets and starts a timer T1 again.

Upon receiving N310 consecutive "out-of-sync" indications for the serving cell from lower layers, Layer 3 of the UE starts timer T310 (S905).

When at least one serving beam meets in-sync condition, the Layer 1 of the UE informs in-sync to upper layer within Qin evaluation period (S907).

In case of N best beams, when at least one best beam among N best beams meets in-sync condition, the Layer 1 of the UE informs in-sync to upper layer within Qin evaluation period.

In case of timer based determination, when at least one beam among N best beams, serving beams or any beams meets in-sync condition during T1 is running, the Layer 1 of the UE informs in-sync to upper layer within Qin evaluation period (even during T1 is running).

Even if multiple beams meet in-sync condition, only 1 in-sync is informed from Layer 1 of the UE to upper layer within Qin evaluation period.

Upon receiving N311 consecutive "in-sync" indications for the serving cell from lower layers while T310 is running, the UE stops the timer T310 (S909).

In case of N best beams, N best beams can be different when Layer 1 of the UE estimates out-of-sync/in-sync condition for each beam.

Upon T310 expiry, the Layer 3 of the UE considers radio link failure to be detected (S911).

Figure 10:
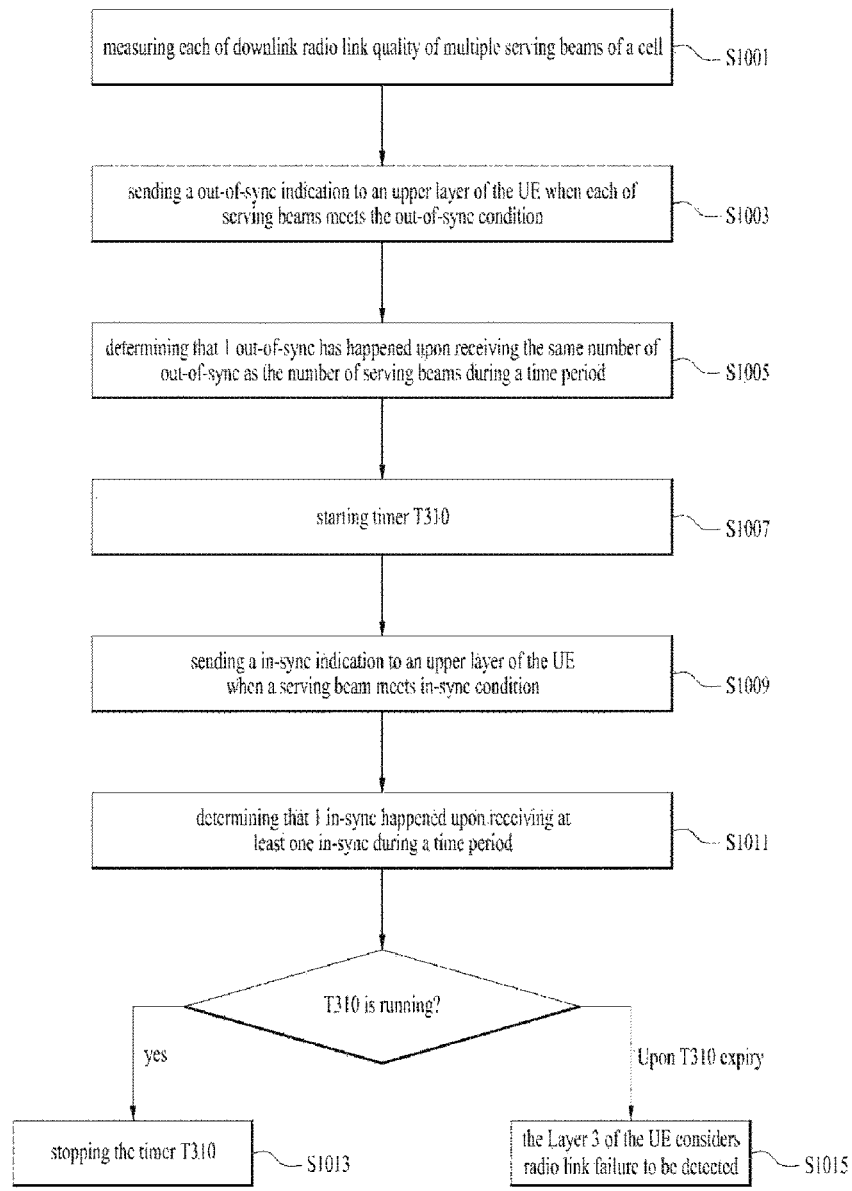

In case of timer based determination, the Layer 1 of the UE informs an out-of-sync for the serving cell to upper layer upon T1 expiry, if there is no beam among any beams until the T1 expiry. That is, when the UE determines the RLF, it is possible for the UE to avoid generating the RLF prematurely if there is another good beam (not a serving beam) in the same cell. That is, since it is possible to perform the beam recovery procedure (which is for replacing the bad beam with good beam) during running of T1, the UE can avoid generating the RLF unnecessarily FIG. 10 is a conceptual diagram for performing radio link monitoring and failure procedure of multi beams operation in wireless communication system according to embodiments of the present invention.

In this method, the upper layer (e.g. RRC) of the UE determines that out-of-sync has happened when all the serving beams meet out-of-sync condition. The upper layer of the UE determines that 1 in-sync happened from the upper layer point of view, upon receiving at least one in-sync during a time period. In this method, it is assumed that serving beam can be multiple and Layer 3 of the UE knows the serving beams and identity of each serving beam.

The Layer 1 of the UE measures each of downlink radio link quality of multiple serving beams of a serving cell (S1001). The Layer 1 of the UE sends an out-of-sync indication for the serving cell to the higher layers within Qout evaluation period, when each of serving beams meets the out-of-sync condition defined above (S1003).

Preferably, when Layer 1 of the UE sends an out-of-sync indication for the serving cell to the upper layer of the UE, the Layer 1 can also informs the beam identity of the beam which an out-of-sync has happened.

Upon receiving the same number of out-of-sync as the number of serving beams during a time period, the upper layer of the UE determines that 1 out-of-sync has happened from the upper layer point of view (S1005).

Preferably, the UE can determine that 1 out-of-sync has happened from the upper layer point of view if all the serving beam identities are received during the time period of this step of S1003.

Upon Layer 3 of the UE determining N310 consecutive "out-of-sync" for the serving cell has happened, Layer 3 of the UE start timer T310 (S1007).

When a serving beam meets in-sync condition, the Layer 1 of the UE informs in-sync to upper layer within Qin evaluation period (S1009).

Upon receiving at least one in-sync during a time period, the upper layer of the UE determines that 1 in-sync happened from the upper layer point of view (S1011).

Upon Layer 3 of the UE determining N311 consecutive "in-sync" for the serving cell has happed while T310 is running, the UE stops the timer T310 (S1013), and upon T310 expiry, the Layer 3 of the UE consider radio link failure to be detected (S1015).

In the above methods, the used counter/timer value (e.g. N, N310, N311, T310) is configured by the network or preconfigured/fixed. N is positive integer value.

In the above methods, if radio link failure is detected, the UE performs cell selection and RRC connection re-establishment procedure.

Figure 11:
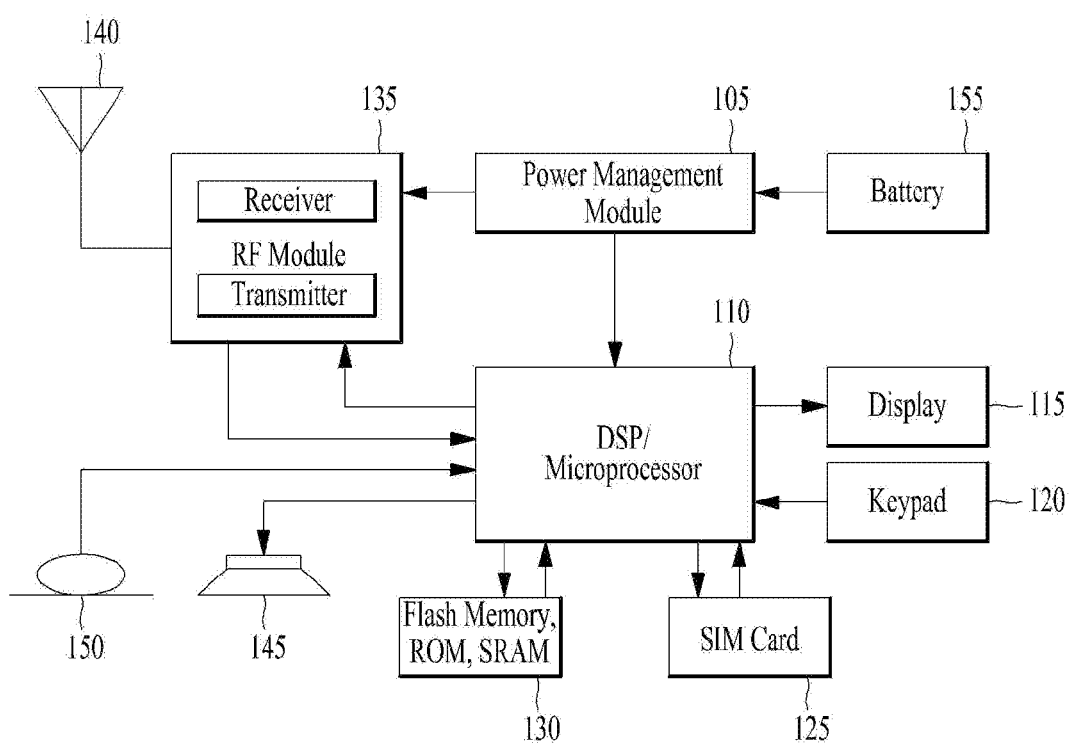
FIG. 11 is a block diagram of a communication apparatus according to an embodiment of the present invention.

FIG. 11 is a block diagram of a communication apparatus according to an embodiment of the present invention.

The apparatus shown in FIG. 11 can be a user equipment (UE) and/or eNB adapted to perform the above mechanism, but it can be any apparatus for performing the same operation.

As shown in FIG. 11, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 11 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method performed by a user equipment (UE) operating in a wireless communication system, the method comprising:
    measuring downlink radio link quality for each of multiple beams configured for the UE;
    sending a first information for an out-of-sync to an upper layer of the UE based on all beams of the multiple beams meeting an out-of-sync condition; and
    sending a second information for an in-sync to the upper layer of the UE based on at least one beam of the multiple beams meeting an in-sync condition,
    wherein, based on downlink radio link quality of a beam becoming worse than a first threshold, the UE determines that the beam meets the out-of-sync condition,
    wherein, based on downlink radio link quality of the beam becoming better than a second threshold, the UE determines that the beam meets the in-sync condition,
    wherein based on the all beams of the multiple beams not meeting the out-of-sync condition and at least one beam of the multiple beams not meeting the in-sync condition, the UE does not send the first information and the second information,
    wherein the multiple beams are serving beams which are currently used for beam problem detection of the UE, and
    wherein based on the beam problem being detected, the UE uses candidate beams to replace the serving beams.

2. The method according to claim 1,
    wherein the UE determines that the beam meets the out-of-sync condition within a first time period,
    wherein the UE determines that the beam meets the in-sync condition within a second time period, and
    wherein the first time period and the second time period are equally applied to the each of the multiple beams.

3. The method according to claim 2, wherein even in a state in which two or more beams meet in-sync condition, only one second indication is transmitted to the upper layer of the UE within the first time period.

4. The method according to claim 1, further comprising:
    starting a timer based on sending the first information to the upper layer of the UE; and
    re-sending the first information to the upper layer of the UE upon the timer expiry, based on the all beams of the multiple beams meeting the out-of-sync condition upon the timer expiry.

5. The method according to claim 2, wherein the first time period is longer than the second time period.

6. The method according to claim 1, further comprising:
starting a timer T310 by a RRC layer, based on receiving N310 consecutive first information for a cell from lower layers;
stopping the timer T310 by a RRC layer, based on receiving N311 consecutive second information for the cell from lower layers while the timer T310 is running; and
considering radio link failure to be detected by a RRC layer, upon the timer T310 expiry.

7. A User Equipment (UE) configured to operate in a wireless communication system, the UE comprising:
a Radio Frequency (RF) module; and
at least one processor; and
at least one computer memory operably coupled with the at least one processor and storing instructions that, when executed by the at least one processor, perform operations comprising:
measuring downlink radio link quality for each of multiple beams configured for the UE;
sending, through the RF module, a first information for an out-of-sync to an upper layer of the UE based on all beams of the multiple beams meeting an out-of-sync condition; and
sending, through the RF module, a second information for an in-sync to the upper layer of the UE based on at least one beam of the multiple beams meeting an in-sync condition,
wherein, based on downlink radio link quality of a beam becoming worse than a first threshold, the UE determines that the beam meets the out-of-sync condition,
wherein, based on downlink radio link quality of the beam becoming better than a second threshold, the UE determines that the beam meets the in-sync condition,
wherein based on the all beams of the multiple beams not meeting the out-of-sync condition and at least one beam of the multiple beams not meeting the in-sync condition, the UE does not send the first information and the second information,
wherein the multiple beams are serving beams which are currently used for beam problem detection of the UE, and
wherein based on the beam problem being detected, the UE uses candidate beams to replace the serving beams.

8. The UE according to claim 7,
wherein the UE determines that the beam meets the out-of-sync condition within a first time period,
wherein the UE determines that the beam meets the in-sync condition within a second time period, and
wherein the first time period and the second time period are equally applied to the each of the multiple beams.

9. The UE according to claim 8, wherein even in a state in which two or more beams meet in-sync condition, only one second indication is transmitted to the upper layer of the UE within the first time period.

10. The UE according to claim 8, wherein the first time period is longer than the second time period.

11. The UE according to claim 7, wherein the operations further comprise:
starting a timer based on sending the first information to the upper layer of the UE, and
re-sending the first information to the upper layer of the UE upon the timer expiry, based on the all beams of the multiple beams meeting the out-of-sync condition upon the timer expiry.

12. The UE according to claim 7, wherein the operations further comprise:
starting a timer T310 by a RRC layer, based on receiving N310 consecutive first information for a cell from lower layers;
stopping the timer T310 by a RRC layer, based on receiving N311 consecutive second information for the cell from lower layers while the timer T310 is running; and
considering radio link failure to be detected by a RRC layer, upon the timer T310 expiry.

13. An apparatus configured to control a User Equipment (UE) to operate in a wireless communication system, the apparatus comprising:
at least one processor; and
at least one computer memory operably coupled with the at least one processor and storing instructions that, when executed by the at least one processor, perform operations comprising:
measuring each of downlink radio link quality of multiple beams configured for the UE;
sending a first information for an out-of-sync to an upper layer of the UE based on all beams of the multiple beams meeting an out-of-sync condition; and
sending a second information for an in-sync to the upper layer of the UE based on at least one beam of the multiple beams meeting an in-sync condition,
wherein, based on downlink radio link quality of a beam becoming worse than a first threshold, the UE determines that the beam meets the out-of-sync condition,
wherein, based on downlink radio link quality of the beam becoming better than a second threshold, the UE determines that the beam meets the in-sync condition,
wherein based on the all beams of the multiple beams not meeting the out-of-sync condition and at least one beam of the multiple beams not meeting the in-sync out of sync condition, the UE does not send the first information and the second information,
wherein the multiple beams are serving beams which are currently used for beam problem detection of the UE, and
wherein based on the beam problem being detected, the UE uses candidate beams to replace the serving beams.

14. The apparatus according to claim 13,
wherein the UE determines that the beam meets the out-of-sync condition within a first time period,
wherein the UE determines that the beam meets the in-sync condition within a second time period, and
wherein the first time period and the second time period are equally applied to the each of the multiple beams.

15. The apparatus according to claim 14, wherein even in a state in which two or more beams meet in-sync condition, only one second indication is transmitted to the upper layer of the UE within the first time period.

16. The apparatus according to claim 14, wherein the first time period is longer than the second time period.

17. The apparatus according to claim 13, wherein the operations further comprise:
Starting a timer based on sending the first information to the upper layer of the UE, and
re-sending the first information to the upper layer of the UE upon the timer expiry, based on the all beams of the multiple beams meeting the out-of-sync condition upon the timer expiry.

18. The apparatus according to claim 13, wherein the operations further comprise:

starting a timer T310 by a RRC layer, based on receiving N310 consecutive first information for a cell from lower layers;

stopping the timer T310 by a RRC layer, based on receiving N311 consecutive second information for the cell from lower layers while the timer T310 is running; and considering radio link failure to be detected by a RRC layer, upon the timer T310 expiry.

* * * * *